United States Patent
Pisanova et al.

(10) Patent No.: US 10,344,199 B2
(45) Date of Patent: Jul. 9, 2019

(54) WELL TREATMENT METHODS AND COMPOSITIONS

(71) Applicant: PeroxyChem LLC, Philadelphia, PA (US)

(72) Inventors: Elena Pisanova, Amherst, NY (US); John M. Rovison, Sanborn, NY (US)

(73) Assignee: PEROXYCHEM LLC, Philadelphia, PA (US)

( * ) Notice: Subject to any disclaimer, the term of this patent is extended or adjusted under 35 U.S.C. 154(b) by 0 days.

(21) Appl. No.: 15/415,539

(22) Filed: Jan. 25, 2017

(65) Prior Publication Data
US 2017/0210969 A1 Jul. 27, 2017

Related U.S. Application Data

(60) Provisional application No. 62/286,765, filed on Jan. 25, 2016.

(51) Int. Cl.
*E21B 37/06* (2006.01)
*C09K 8/524* (2006.01)

(52) U.S. Cl.
CPC .............. *C09K 8/524* (2013.01); *E21B 37/06* (2013.01)

(58) Field of Classification Search
None
See application file for complete search history.

(56) References Cited

U.S. PATENT DOCUMENTS

| | | | |
|---|---|---|---|
| 4,144,179 A | 3/1979 | Chatterji | |
| 4,243,638 A * | 1/1981 | Jackovitz | C01G 43/00 299/5 |
| 4,464,268 A | 8/1984 | Schievelbein | |
| 7,380,606 B2 | 6/2008 | Pursley et al. | |
| 8,091,646 B2 | 1/2012 | Quintero et al. | |
| 8,211,835 B2 | 7/2012 | Howard et al. | |
| 8,415,278 B2 | 4/2013 | Sanders et al. | |
| 8,575,073 B2 | 11/2013 | Ali et al. | |
| 8,575,075 B2 | 11/2013 | Huang et al. | |
| 8,871,695 B2 | 10/2014 | Quintero et al. | |
| 9,006,153 B2 | 4/2015 | Lin et al. | |
| 9,018,142 B2 | 4/2015 | Rovison, Jr. et al. | |
| 2005/0061502 A1 | 3/2005 | Hanes, Jr. et al. | |
| 2006/0042797 A1* | 3/2006 | Fredd | C09K 8/72 166/282 |
| 2006/0148658 A1 | 7/2006 | Hanes, Jr. et al. | |
| 2007/0265171 A1* | 11/2007 | Javora | C09K 8/52 507/90 |
| 2007/0284101 A1 | 12/2007 | Valeriano et al. | |
| 2010/0048431 A1 | 2/2010 | Saini et al. | |
| 2010/0093891 A1 | 4/2010 | Li et al. | |
| 2010/0210483 A1* | 8/2010 | D'Aloisio | C09K 8/52 507/130 |
| 2011/0005773 A1 | 1/2011 | Dusterhoft et al. | |

(Continued)

OTHER PUBLICATIONS

PCT Search Report and Written Opinion dated May 4, 2017 for corresponding PCT Application PCT/US2017/014930.

(Continued)

*Primary Examiner* — Andrew Sue-Ako (74) *Attorney, Agent, or Firm* — Duane Morris LLP (57) ABSTRACT

Provided herein are methods and compositions for treatment of a subterranean wellbore that has become clogged with sludge deposits comprising a synthetic polymer and an oil tar.

15 Claims, 5 Drawing Sheets

(56) References Cited

U.S. PATENT DOCUMENTS

2012/0160497 A1* 6/2012 Varadaraj ............... C09K 8/035
 166/305.1
2014/0221256 A1 8/2014 Holtsclaw et al.

OTHER PUBLICATIONS

Carmen P.S. and Cawiezel, K.E., "Successful Breaker Optimization for Polyacrylamide Friction Reducers Used in Slickwater Fracturing" 2007 SPE Hydraulic Fracturing Technology Conference, College Station, Texas. (SPE 106162) pp. 1-9.

* cited by examiner

WELL TREATMENT METHODS AND COMPOSITIONS

FIELD OF THE INVENTION

The present invention relates to methods and compositions for use in subterranean operations to restore the permeability of a wellbore or an underground formation near a wellbore that has become impeded by sludge or tar deposits.

BACKGROUND OF THE INVENTION

Hydraulic fracturing, also known as hydro-fracking or fracking, is used by the petroleum industry to stimulate production of oil or gas from a well. Hydrocarbons such as oil and natural gas can be obtained from subterranean hydrocarbon bearing geological formations by pumping a pressurized fluid into a well to create a fracture in the formation or to enlarge a pre-existing fracture in the formation. In a procedure known as slick water fracturing, polyacrylamide polymers are commonly used to reduce pumping pressure by reducing the frictional drag of the water against the well inner tubular walls, the interface of the well tube and geological formation at the puncture points of the well tube, and the penetrated crevices formed by fracturing. Such fracturing fluids have a high viscosity.

The polymers used in slick water fracturing often persist within the producing formation. The polymer residue can plug the permeability of the rock and hinder recovery of the water used in the fracturing treatment. The polymer residue also combines with heavy oil tar by-products. The resulting polymer/tar residue sludge deposits accumulate in production tubing and equipment. The sludge deposits can form a filter cake at the injector near wellbore, resulting in damage to the injectors, loss of injectivity, and a loss of capacity once the well is put into production. The polymer/tar residue can plug the permeability of the rock and hinder recovery of the water used in the fracturing treatment. In addition, the residue can foul surface equipment such as solids screening equipment. The frequent cleaning needed to remove the accumulated deposits is time-consuming and reduces the efficient recovery of petroleum products.

Strategies to mitigate polymer persistence include the use of oxidizers producing free radicals to break down the viscosity of polyacrylamide in the slick water. However, these approaches were generally developed for the use under conditions of high temperatures and/or acidic environments. Many wells are located in cold climates. Slick water typically has a neutral to alkaline pH. Strategies for removal of wellbore tar incursion have relied generally on mechanical methods, such as increased hydrostatic pressure in the wellbore, or chemical methods, based on solubilizers or dispersants. These approaches typically do not mitigate polymer persistence. There is a continuing need for methods of efficient methods of well cleaning that are effective under field conditions.

SUMMARY OF THE INVENTION

Provided herein are methods and compositions for treating a wellbore or underground formation in order to restore the permeability of a wellbore or a formation that has become impeded by sludge or tar deposits. The method can include the steps of introducing an aqueous composition comprising an oxidizer, a chelated metal activator, and a surfactant into the wellbore, wherein the wellbore comprises one or more sludge deposits on the wellbore, and contacting the sludge deposits with the aqueous composition. In some embodiments, the oxidizer can be hydrogen peroxide, carbamide peroxide, peracetic acid, sodium persulfate or potassium persulfate. In some embodiments, the chelated metal activator can be FeEDTA, CuEDTA, FeDTPA, ferric citrate, ferrous citrate, ferrous isocitrate, ferrous aconitate, ferrous salicylate, zinc gluconate, copper citrate, ferrous lactate, or ferrous gluconate. In some embodiments the surfactant can be ethoxylated castor oil, ethoxylated fatty acids, D-limonene, alcohol sulfates, alcohol ethoxylates, amine N-oxides or a combination thereof. The sludge deposit comprises a synthetic polymer and an oil tar or oil tar byproduct.

DETAILED DESCRIPTION

This description of preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. When only a single machine is illustrated, the term "machine" shall also be taken to include any collection of machines that individually or jointly execute a set (or multiple sets) of instructions to perform any one or more of the methodologies discussed herein. In the claims, means-plus-function clauses, if used, are intended to cover the structures described, suggested, or rendered obvious by the written description or drawings for performing the recited function, including not only structural equivalents but also equivalent structures.

The present invention is directed to methods and compositions for treating a wellbore or an underground formation in order to restore the permeability of the wellbore or formation that has become impeded by sludge or tar deposits. Agents for reducing viscosity in polymer-containing well treatment fluids are typically referred to as breakers. The inventors have found that treatment of cross-linked partially hydrolyzed polyacrylamide gel with peroxide that had been activated by a chelated metal compound resulted in a rapid decrease in viscosity of the gel. Moreover, the treatment was effective at low temperatures (<120° F.) and the relatively high pH commonly found in slick water. The inventors have also found that the combination of viscosity reducing agents with a surfactant effectively solubilized HPAM-containing sludge.

The methods disclosed herein are generally useful for treatment of a wellbore or formation in order to restore the permeability of the wellbore that has become impeded by synthetic polymer-containing sludge or tar deposits. The methods generally include reducing the viscosity of a polymer-containing aqueous well treatment fluid in a subterranean environment, oxidizing or decomposing the gelled polymer sludge, and solubilizing the water insoluble tar deposits. The methods can include introducing an oxidizer, a chelated metal activator, and a surfactant into the polymer-containing aqueous well treatment fluid to form a well treatment composition. The concentration of the oxidizer, the chelated metal activator, and the surfactant can vary. Regardless of the specific concentrations of oxidizer, chelated metal activator, and surfactant in the well treatment composition, the well treatment composition is directed into the subterranean environment in an amount and for a time sufficient to reduce the viscosity of the polymer-containing aqueous well treatment fluid and solubilize the tar deposits. The methods can be used in a hydraulic fracturing operation to break down or defragment polyacrylamide and thus to decompose a polyacrylamide containing sludge or filter cake formed during operation of a well. In some embodiments, the subterranean environment can be a geological formation that has been penetrated by a wellbore.

Even though the polymers used in slick water fracturing are water soluble, they can become deposited in the sand or rock formation adjacent the wellbore, reducing permeability of the formation. The polymer molecules are typically too large to penetrate the permeable matrix of the formation. The polymer residue can combine with heavy oil tar by-products, forming a tacky substance that can readily adhere to any surface that it contacts, including the surfaces of the well bore and/or any equipment utilized during the drilling operation. This polymer residue/tar sludge can also incorporate soil and rock solids (including, but not limited to sand) into a persistent amalgam. The compositions of the invention can be injected into a wellbore to contact sludge deposits on surfaces of the wellbore, and drilling equipment as well as formations near the wellbore. Exposure of the sludge deposits to the compositions of the invention can provide dissolution and dispersal of the sludge deposits in situ.

The oil tar that combines with synthetic polymers used in drilling operations is typically a mixture of hydrocarbons, for example, nonpolar hydrocarbons, asphaltenes and paraffins. We may refer to the resulting mixture as a sludge, a deposit, and amalgam or a residue. Filter cake generally refers to deposits of such insoluble material left on filters or other drilling equipment and which can substantially impede the flow of liquid. Slick water generally refers to an aqueous solution containing a friction reducing polymer, for example, acrylamide. In some embodiments, slick water can include a breaker.

Well Treatment Fluids and Polymers

Hydraulic fracturing typically relies on solid particulate material, for example inorganic solids like sand, silica, quartz, diatomaceous earth, in coated or uncoated form, or gravel, to keep fractures open and provide improved fluid conductivity through the matrix. In general, the viscosity modifying polymers increase the ability of the well treatment fluid to retain particulates in suspension. Viscosity-modifying polymers or copolymers used in well treatment fluids function can increase the fluid viscosity or promote a thickened or viscous or semi-gelled or gelled state in the aqueous well treatment fluid.

The methods and compositions disclosed herein can be used with polymer- or copolymer-containing aqueous well treatment fluids that are typically used in subterranean oil- and gas-field well operations, for example, well drilling, formation fracturing, productivity enhancement, and secondary recovery. Such aqueous well treatment fluids typically contain one or more viscosity-modifying polymers or copolymers.

Viscosity modifying polymers and copolymers generally function as viscosity enhancers (as a thickener or gelling agent). Some polymers and copolymers may alternatively function as flowing friction reducers. This functionality, viscosity enhancement or flowing friction reduction, is often concentration dependent. As a general rule, higher concentrations of a (dual function) viscosity-modifying polymer/copolymer provide viscosity-enhancement in an aqueous well treatment fluid, but low concentrations of the same polymer/copolymer provide flowing friction-reduction functionality.

Viscosity-enhancing polymers are typically used in amounts of about 0.01 to about 10 wt %, or about 0.1 to about 5 wt %, based on the weight of the aqueous fluid. A viscosity-enhanced well fluid can include an amount of viscosity-enhancing polymer sufficient to provide a fluid viscosity in excess of at least about 20 cP, at least about 25 cP, at least about 30 cP, at least about 35 cP, at least about 40 cP, at least about 45 cP, at least about 50 cP, at least about 55 cP, at least about 60 cP, at least about 65 cP, at least about 70 cP, at least about 75 cP, at least about 80 cP, at least about 85 cP, at least about 90 cP, at least about 95 cP, at least about 100 cP or more.

The viscosity-modifying polymer can be a natural polymers, including modified forms of natural polymers, or a synthetic polymer, including synthetic polymers and copolymers and their derivatives. The viscosity-modifying polymers can be water-soluble at the concentrations employed in the aqueous well treatment fluids.

Viscosity-modifying polymers that can increase the fluid viscosity include synthetic polymers such as acrylamide-derived polymers and copolymers and acrylate-derived polymers and copolymers, often in crosslinked form. Synthetic polymers used in slick water fracturing include polyacrylamide, polymers containing acrylamide monomer, and adducts thereof such as partially hydrolyzed acrylamide or alkoxylated acrylamide. These polymers range in molecular weight from about 500,000 to about 10,000,000 or more.

Acrylamide-derived polymers can include, for example, polyacrylamide, acrylamide-acrylate (acrylic acid) copolymers, acrylic acid-methacrylamide copolymers, partially hydrolyzed polyacrylamide copolymers (PHPA), partially hydrolyzed polymethacrylamides, and acrylamide-methyl-propane sulfonate copolymers (AMPS). Cross-linked acrylamide-based polymers that exhibit viscosity-enhancing functionality have been described in U.S. Pat. No. 4,995,461 of Sydansk (Marathon Oil) and in U.S. Pat. No. 5,268,112 of Hutchins et al. (Union Oil of California).

Other viscosity-enhancing polymers include natural and synthetic water-soluble polysaccharides, including guar and guar derivatives such as hydroxypropyl guar and carboxymethyl hydroxypropyl guar; xanthan and xanthan derivatives; alginates and alginate derivatives; carrageenan; cellulosic polymers and cellulosic derivatives such as hydroxyethylcellulose, hydroxypropylcellulose and carboxymethylhydroxyethylcellulose; and other biopolymers or synthetic polymers or copolymers that exhibit gelling or viscosity-enhancing functionality, and any combination thereof.

The polymers may either be linear (non-crosslinked) or crosslinked, e.g., using cross-linking agents such as borate or zirconate or titanate in the case of polysaccharides like guar, or other known crosslinkers in the case of synthetic polymers and copolymers like acrylamide-derived polymers and copolymers.

Crosslinked polymers, such as crosslinked hydroxypropyl guar (HPG), provide the advantage of high fluid viscosities at lower usage rates, as compared with non-crosslinked or linear polymers/copolymers. Such crosslinked polymers can provide viscous fluid characteristics even at high fluid temperatures and are generally superior to linear polymers or copolymers in their proppant suspension capabilities.

Polymers and copolymers may also function to reduce the flowing friction, reduce flow turbulence, or to improve flow characteristics of the aqueous well treatment fluid. Such polymers are used in amounts that provide flowing friction-reducing functionality in the aqueous fluid. Flowing polymers are typically used in relatively small amounts of about 0.01 to about 1 wt %, or about 0.05 to about 0.5 wt %, based on the weight of the aqueous fluid. A friction-reduced well fluid typically contains an amount of flowing friction-reducing polymer sufficient to provide a fluid viscosity of about 10 cP, about 9 cP, about 8 cP, about 7 cP, about 6 cP, about 5 cP, about 4 cP, about 3 cP, about 2 cP or less. (Pure water has a viscosity of about 1 cP).

Viscosity-reducing polymers that can serve as friction reducers include acrylamide-derived polymers and copolymers, such as polyacrylamide (sometime abbreviated as PAM), acrylamide-acrylate (acrylic acid) copolymers, acrylic acid-methacrylamide copolymers, partially hydrolyzed polyacrylamide copolymers (PHPA), partially hydrolyzed polymethacrylamides, and acrylamide-methyl-propane sulfonate copolymers (AMPS). Various derivatives of such polymers and copolymers, e.g., quaternary amine salts, hydrolyzed versions, are also within the scope of the polymers and copolymers disclosed herein.

Commercial acrylamide-based polymer products that have friction-reducing functionality include, for example, New-Drill™ products (Baker Hughes, Houston, Tex.), FRW-15 friction reducer (BJ Services, Houston, Tex.), and FR56™ friction reducer (Halliburton, Houston, Tex.). Acrylamide-based polymers and copolymers have also been described in the patent literature for use as friction reducers in oil-field applications such as well fracturing, e.g., U.S. Pat. No. 3,254,719 of Root (Dow Chemical) and U.S. Pat. No. 4,152,274 of Phillips et al. (Nalco Chemical).

Other viscosity-reducing polymers (besides acrylamide-derived polymers and copolymers) that can serve as friction reducers include guar and guar derivatives, acrylate-derived polymers and copolymers like polymethylmethacrylate, ethylene oxide-derived polymers such as polyethyleneoxide, alkoxylated alkanolamides, and other biopolymers or synthetic polymers or copolymers that exhibit viscosity-reducing or friction-reducing functionality.

Regardless of the specific polymer that is used and regardless of whether the objective is to increase fluid viscosity or reduce friction, the well drilling fluid can include any combination of two or more of the polymers listed above, for example, three, four, five, six, or more polymers.

In some embodiments, the well treatment fluids can also contain additional additives. Additional well treatment additives can include, for example, surfactants, scale preventers, biocides, bacteriocides, stabilizers, corrosion inhibitors, fluid loss control additives, permeability modifiers, nanoparticles, or any combination thereof.

Oxidizers

The methods and compositions disclosed herein include an oxidizer. The oxidizer or oxidizing agent can reduce the molecular weight of the friction-reducing polymer. The fragmented components of the polymer can then be readily removed from the wellbore, thus minimizing damage to the formation. The oxidizer can be, for example, hydrogen peroxide, carbamide peroxide, peracetic acid, sodium persulfate or potassium persulfate.

We may refer to a peroxide as a compound containing an oxygen-oxygen single bond or the peroxide anion ($O_2^{2-}$). In some embodiments, a peroxide can be hydrogen peroxide, e.g., $H_2O_2$. In some embodiments, a peroxide can be a bonded hydrogen peroxide, for example, urea-peroxide $[(NH_2)_2CO \cdot H_2O_2]$ Urea peroxide, also known as carbamide peroxide, is solid adduct of one mole of hydrogen peroxide with one mole of urea. Urea peroxide is a water-soluble crystalline compound that acts as a source of peroxide. Other peroxides within the scope of the invention include bonded or stabilized hydrogen peroxide, such as sodium perborate or sodium percarbonate to generate peroxide in situ; organic peroxides, for example, peroxycarboxylic acid; peroxyacids, such as peracetic acid or peroxyoctanoic acid and mixtures thereof ($C_2$ to $C_8$) in combination and Caro's acid ($H_2SO_5$); aliphatic carboxylic acids, e.g. benzoyl peroxide, salicylic acids and phenolic carboxy acids; and salts of peroxyacids, such as sodium persulfate, potassium persulfate and potassium caroate.

Peroxides can be obtained as aqueous stock solutions and diluted for use. Aqueous hydrogen peroxide stock solutions can contain at least about 8 wt % $H_2O_2$, at least about 15 wt % $H_2O_2$, at least about 20 wt % $H_2O_2$., at least about 27% $H_2O_2$, at least about 35 wt % $H_2O_2$. Aqueous hydrogen peroxide stock solutions with these concentrations, suitable for use in the invention, are readily available from commercial suppliers as stabilized $H_2O_2$ solutions.

Highly concentrated aqueous hydrogen peroxide stock solutions (significantly above 50 wt % $H_2O_2$) can also be used. Aqueous $H_2O_2$ stock solutions above about 50 wt % $H_2O_2$ generally require stringent handling and safety measures. Thus, the aqueous hydrogen peroxide stock solutions can have a concentration in the range of about 8 wt % $H_2O_2$ to about 70 wt % $H_2O_2$, about 15 wt % $H_2O_2$ to about 50 wt % H2O2, about 25 wt % $H_2O_2$ to about 40 wt % $H_2O_2$ Useful stock solutions can have a concentration in the range about 30 wt % $H_2O_2$ to about 40 wt % $H_2O_2$.

Regardless of the concentration of the aqueous hydrogen peroxide stock solution, a sufficient amount of the stock solution is added to the aqueous well treatment fluid to provide the desired concentration. In some embodiments, useful concentrations of the peroxide, for example hydrogen peroxide or urea peroxide, in the well treatment composition can be within a range of about 400 ppm to about 25,000 ppm. Thus, the peroxide concentration can be about 400 ppm, about 500 ppm, about 550 ppm, about 580 ppm, about 600 ppm, about 650 ppm, about 700 ppm, about 750 ppm, about 800 ppm, about 850 ppm, about 900 ppm, about 950 ppm, about 1000 ppm, about 1500 ppm, about 2000 ppm, about 2500 ppm, about 3000 ppm, about 3500, ppm, about 4000 ppm, about 4500 ppm, about 5000 ppm, about 5500 ppm, about 6000 ppm, about 8000 ppm, about 10,000 ppm, about 15,000 ppm, about 20,000 ppm, or about 25,000 ppm. In some embodiments, the peroxide concentration can be from about 500 ppm to about 5000 ppm, from about 500 ppm to about 4000 ppm, from about 500 ppm to about 3500 ppm, from about 500 ppm to about 3000 ppm, from about 500 ppm to about 2500 ppm, from about 500 ppm to about 2000 ppm, from about 500 ppm to about 1000 ppm, from about 1000 ppm to about 2000 ppm, In some embodiments, the oxidizer can be a peracetic acid. Peracetic acid solutions exist as equilibrium solutions containing peracetic acid, hydrogen peroxide, acetic acid and water. Solutions are often identified by the concentration of peracetic acid and hydrogen peroxide. For example, a 15/23 formulation contains 15% by weight of peracetic acid and 23% by weight hydrogen peroxide. Commercially available peracetic acid solutions have typical formulations containing 2-35% peracetic acid and 5-30% hydrogen peroxide, with the remainder being acetic acid and water. In some embodiments, useful peracetic acid concentrations in the well treatment compositions can be about 500 ppm, about 1000 ppm, about 1500 ppm, about 2000 ppm, about 2500 ppm, about 3000 ppm, about 3500 ppm, about 4000 ppm, about 4500 ppm, about 5000 ppm, about 7500 ppm, or about 10,000 ppm.

In some embodiments, the oxidizer can be a persulfate. The persulfate can be a mono-or dipersulfate, or a mixture of a mono or dipersulfate. The dipersulfate can be, for example sodium persulfate or potassium persulfate. In some embodiments, useful sodium persulfate concentrations in the well treatment compositions can be about 500 ppm, about 1000 ppm, about 1500 ppm, about 2000 ppm, about 2500 ppm, about 3000 ppm, about 3500 ppm, about 4000 ppm, about 4500 ppm, about 5000 ppm, about 7500 ppm, about 10,000 ppm, about 15,000 ppm, about 20,000 ppm or about 25,000 ppm.

Activators

Peroxides are typically strong oxidizing agents. However, peroxide-mediated oxidation of polymers such as polyacrylamide polymers generally takes place relatively slowly. Activators, also known as catalytic activators, can be used to convert the peroxide, for example hydrogen peroxide, into free radicals, for more efficient oxidation. The catalytic activation of hydrogen peroxide involves its dissociation or ionization into free radicals, which include hydroxyl (OH—) and hydroperoxyl (also called perhydroxyl) (OOH—) radicals. Exemplary activation reactions are believed to occur by the cleavage of either an O—H bond or an O—O bond in the hydrogen peroxide molecule. Decomposition of hydrogen peroxide also results in the decomposition products of oxygen gas and water.

Useful activators should persist in the environment for a relatively long time period, efficiently destroy the polymer, and be compatible with the oxidant. The activator-oxidizer combinations should be cost-effective and be efficient in a large variety of specific site conditions.

The inventors have found that chelated metal activators effectively activated peroxide to degrade polyacrylamide in polyacrylamide gels. This observation was unexpected because the classic Fenton reaction, which involves oxidation of iron by hydrogen peroxide to form free radicals, tends to be limited by pH. Fenton's reagent is an aqueous solution containing $Fe^{2+}$ and hydrogen peroxide. Fenton chemistry typically is most effective at acidic pH of 3 or below. Slick water often has a pH in the neutral to near neutral basic range, that is, greater than 6.

A catalyst can include a divalent and trivalent transition metal such as Fe (II), FE (III), Cu (II), Mn (II) and Zn (II). Chelating agents can include aminopolycarboxylic acids and salts such as ethylenediamine tetraacetic acid (EDTA), diethylenetriamine pentaacetic acid (DTPA), nitrilotriacetic acid (NTA), Hydroxyethylethylenediaminetriacetic acid (HEDTA) as well as citric acid, isocitric acid, aconitic acid, ascorbic acid, lactic acid, gluconic acid, phosphonates, and glucoheptonates. Useful chelated metal activators include ferric ethylenediamine tetraacetic acid (FeEDTA), ferric diethylenetriamine pentaacetic acid (FeDTPA), ferric citrate, ferrous citrate, ferrous isocitrate, ferrous aconitate, ferrous lactate, ferrous salicylate, zinc gluconate, copper citrate and ethylenediaminetetraacetic acid copper(II) disodium salt (CuEDTA).

The chelated metal activator is added to the peroxide in a concentration effective to activate the peroxide. In some embodiments, useful concentrations of the chelated metal activator, for example FeEDTA, in the well treatment composition can be within a range of about 50 ppm to about 1000 ppm (as Fe concentration). Thus, the chelated metal activator concentration can be about 50 ppm, about 52 ppm, about 55 ppm, about 60 ppm, about 65 ppm, about 70 ppm, about 75 ppm, about 80 ppm, about 85 ppm, about 90 ppm, about 95 ppm, about 100 ppm, about 120 ppm, about 150 ppm, about 180 ppm, about 200 ppm, about 250 ppm, about 300 ppm, about 350 ppm, about 400 ppm, about 450 ppm, about 500 ppm, about 550 ppm, about 600 ppm, about 650 ppm, about 700 ppm, about 750 ppm, about 800 ppm, about 850 ppm, about 900 ppm, about 950 ppm, about 1000 ppm. In some embodiments, the chelated metal activator concentration in the well treatment composition can be from about 50 ppm to about 1000 ppm, about 50 ppm to about 800 ppm, about 50 ppm to about 750 ppm, about 50 ppm to about 600 ppm, about 100 ppm to about 1000 ppm, about 200 ppm to about 1000 ppm, about 100 ppm to about 500 ppm.

In some embodiments, useful concentrations of the chelated metal activator, for example FeEDTA, in the well treatment composition can be within a range of about 50 ppm to about 2000 ppm (expressed as total solid amount). Thus, the chelated metal activator concentration can be about 50 ppm, about 52 ppm, about 55 ppm, about 60 ppm, about 65 ppm, about 70 ppm, about 75 ppm, about 80 ppm, about 85 ppm, about 90 ppm, about 95 ppm, about 100 ppm, about 120 ppm, about 150 ppm, about 180 ppm, about 200 ppm, about 250 ppm, about 300 ppm, about 350 ppm, about 400 ppm, about 450 ppm, about 500 ppm, about 550 ppm, about 600 ppm, about 650 ppm, about 700 ppm, about 750 ppm, about 800 ppm, about 850 ppm, about 900 ppm, about 950 ppm, about 1000 ppm, about 1200 ppm, about 1300 ppm, about 1400 ppm, about 1500 ppm, about 1600 ppm, about 1800 ppm, or about 2000 ppm. In some embodiments, the chelated metal activator concentration in the well treatment composition can be from about 50 ppm to about 2000 ppm, about 50 ppm to about 800 ppm, about 50 ppm to about 750 ppm, about 50 ppm to about 600 ppm, about 100 ppm to about 1000 ppm, about 200 ppm to about 1000 ppm, about 100 ppm to about 1500 ppm, about 100 ppm to about 500 ppm.

Surfactants

The compositions and methods disclosed herein also contain one or more surfactants. The surfactant can be an ionic or a non-ionic surfactant. The non-ionic surfactant can be an ethoxylate. Exemplary surfactants include ethoxylated castor oil, ethoxylated fatty acids, D-limonene, alcohol sulfates, alcohol ethoxylates, amine N-oxides and mixtures thereof. The concentration of surfactant can vary depending upon the specific surfactant or combination of surfactants used. Generally the surfactant concentration in the well treatment compositions can be from between about 0.05% to about 5.0% wt/vol. The surfactant can be obtained as a concentrated stock solution and diluted for use. In some embodiments, useful surfactant concentrations in the well treatment compositions can be about 0.05%, about 0.1%, about 0.2%, about 0.3%, about 0.4%, about 0.5%, about 0.6%, about 0.75%, about 0.8%, about 1.0%, about 1.2%, about 1.25%, about 1.5%, about 1.75%, about 2.0%, about 2.25%, about 2.5%, about 3.0%, about 3.5%, about 4%, about 4.5%, or about 5%.

Co-Solvents

In some embodiments, the aqueous well treatment fluids can include or exclude a co-solvent. Co-solvents are typically added to the wellbore fluid to prevent its freezing in coldclimates. Exemplary co-solvents include methanol or isopropanol or a mixture thereof. Co-solvent concentrations can range from about 1% to about 15%. In some embodiments, useful co-solvent concentrations can be about 1%, about 2%, about 3%, about 4%, about 5%, about 6%, about 7%, about 8%, about 9%, about 10%, about 12%, or about 15%.

The pH of the polymer-containing aqueous well treatment fluids can range from about neutral to alkaline. The pH can be at least about pH 6.0, at least about pH 6.5, at least about pH 6.8, at least about pH 7.0, at least about pH 7.1, at least about pH 7.2, at least about pH 7.3, at least about pH 7.4, at least about pH 7.5, at least about pH 7.6, at least about pH 7.7, at least about pH 7.8, at least about pH 7.9, at least about pH 8.0, at least about pH 8.1, at least about pH 8.2, at least about pH 8.3, at least about pH 8.4, at least about pH 8.5, at least about pH 8.6, at least about pH 8.7, at least about pH 8.8, at least about pH 8.9, at least about pH 9.0, at least about pH 9.1, at least about pH 9.2, at least about pH 9.3, at least about pH 9.4, at least about pH 9.5, at least about pH 9.6, at least about pH 9.7, at least about pH 9.8, at least about pH 9.9, at least about pH 10.0, at least about pH 10.1, at least about pH 10.2, at least about pH 10.3, at least about pH 10.4, at least about pH 10.5, at least about pH 10.6, at least about pH 10.7, at least about pH 10.8, at least about pH 10.9, or at least about pH 11.0. In general, the pH of the polymer-containing aqueous well treatment fluids will be about pH 12 or less, although certain high temperature applications may range up to pH 14.

The pH of the well treatment compositions of the invention can range from about neutral to alkaline. The pH can be at least about pH 6.0, at least about pH 6.5, at least about pH 6.8, at least about pH 7.0, at least about pH 7.1, at least about pH 7.2, at least about pH 7.3, at least about pH 7.4, at least about pH 7.5, at least about pH 7.6, at least about pH 7.7, at least about pH 7.8, at least about pH 7.9, at least about pH 8.0, at least about pH 8.1, at least about pH 8.2, at least about pH 8.3, at least about pH 8.4, at least about pH 8.5, at least about pH 8.6, at least about pH 8.7, at least about pH 8.8, at least about pH 8.9, at least about pH 9.0, at least about pH 9.1, at least about pH 9.2, at least about pH 9.3, at least about pH 9.4, at least about pH 9.5, at least about pH 9.6, at least about pH 9.7, at least about pH 9.8, at least about pH 9.9, at least about pH 10.0, at least about pH 10.1, at least about pH 10.2, at least about pH 10.3, at least about pH 10.4, at least about pH 10.5, at least about pH 10.6, at least about pH 10.7, at least about pH 10.8, at least about pH 10.9, or at least about pH 11.0.

Adjustment of the fluid pH may or may not be needed with the aqueous well treatment fluid containing a viscosity-modifying polymer. The typical pH found in slick water fluids is around 6.0 or greater. If an adjustment of pH to the alkaline range is needed, the pH can be increased by the addition of an alkaline or basic compound or base. Exemplary alkaline compounds include, sodium hydroxide, calcium hydroxide, potassium hydroxide, sodium bicarbonate, sodium carbonate, any of the sodium phosphates, inorganic or organic alkaline compounds, and mixtures thereof. If an adjustment of the pH to an acidic range is needed, the pH can be decreased by the addition of an acid or acidic compound. Exemplary acidic compounds include sulfuric acid, hydrochloric acid, nitric acid, phosphoric acid, citric acid, acetic acid, tartaric acid, succinic acid, inorganic or organic acids, or acidic compounds or a combination thereof.

Temperature

The well treatment fluid compositions disclosed herein are useful for treatment of wells located in environments in which lower temperatures prevail. For example, environmental temperature can range from at least about $-10°$ C. to at least about $95°$ C. The temperature of the subterranean environment may vary depending upon the depth of the well, the nature of the geological formation, the location, and the surface environmental temperature. Thus the temperature can be at least about $-10°$ C., at least about $-5°$ C., at least about $0°$ C., at least about $5°$ C., at least about $10°$ C., at least about $15°$ C., at least about $20°$ C., at least about $25°$ C., at least about $30°$ C., at least about $35°$ C., at least about $40°$ C., at least about $45°$ C., at least about $50°$ C., at least about $55°$ C., at least about $60°$ C., at least about $65°$ C., at least about $70°$ C., at least about $75°$ C., at least about $80°$ C., at least about $85°$ C., at least about $90°$ C., or at least about $95°$ C. In some embodiments, the environmental temperature can range from at least about $-10°$ C. to at least about $95°$ C., at least about $-10°$ C. to at least about $50°$ C., at least about $0°$ C. to at least about $30°$ C., at least about $10°$ C. to at least about $80°$ C., at least about $15°$ C. to at least about $75°$ C., at least about $20°$ C. to at least about $60°$ C., at least about $25°$ C. to at least about $50°$ C., or at least about $30°$ C. to at least about $45°$ C. Other exemplary environmental temperatures include temperatures from about $-5°$ C. to at least about $160°$ C.

Since large volumes of water are employed in the aqueous well treatment fluids that are introduced into subterranean environments, the actual well treatment fluid temperature is tends to be the ambient temperature of the subterranean formation. Heating of the aqueous well treatment fluid at the surface is normally impractical or uneconomic because of the large volumes of fluid involved. The temperature at which the aqueous well treatment fluid of the invention is subjected or maintained is typically the formation temperature, i.e., the temperature of the subterranean formation where the well treatment fluid is employed, i.e., the bottom hole temperature. These temperatures may vary depending upon the depth of the well, the nature of the formation, and the environment.

Duration of Treatment

The methods disclosed herein provide effective viscosity reduction of polyacrylamide-based slick water in relatively short time periods. The actual time periods may vary depending upon environmental conditions, fracture length, and the decrease in viscosity required to recover the hydrocarbons from the treated subterranean formation. Typically polymer or copolymer-containing well treatment fluids are used to provide the viscosity-enhancing functionality over only a few hours after their initial introduction into the subterranean environment, e.g., between 1-12 hours or typically 2-5 hours. In the case of thickened or partially gelled aqueous well treatment fluids, e.g., fracturing fluids containing crosslinked or partially crosslinked polymers or copolymers or other viscosity-enhancing polymers or copolymers or circumstances in which there has been substantial deposition of sludge on the surfaces of the well bore, filters or equipment, a substantial or significant viscosity reduction is desirable for efficient removal or recovery of the gas or oil product from the treated subterranean formation. For efficient removal of an acrylamide containing filter cake or sludge having high molecular weight petroleum hydrocarbons and minerals in its matrix, treatment times may extend to 24 hrs.

The fluid viscosity of the polymer-containing aqueous well treatment fluid, especially fluids containing guars and other cross-linked polymers, can be reduced to a viscosity of less than about 100 cP. In some embodiments the reduction can be less than about 50 cP, less than about 40 cP, less than about 30 cP, less than about 20 cP, less than about 15 cP, less than about 10 cP, less than about 5 cP, less than about 1 cP, less than about 0 cP, In slickwater applications, the initial viscosities can be substantially lower than other applications and viscosity breaking is achieved with reductions from <100 cP to as low as about 5 cP. These viscosity reductions are based on the presumption that the initial aqueous well treatment fluid viscosity is well in excess of these stated reduced viscosity target values. In the case of aqueous fluid compositions that contain polymers or copolymers used to achieve flowing friction reduction, e.g., slick water fluids, the initial viscosity of such fluids is relatively low (in comparison to thickened fracturing fluids). In some embodiments, viscosity reductions that approach the viscosity of water containing no additives, about 1 cP, can be desirable.

In some embodiments, the oxidizer, the activator, and the surfactant are introduced into to the wellbore separately. In some embodiments, the oxidizer, the activator and the surfactant can be combined and then the combined oxidizer, activator, and surfactant can be introduced into the wellbore. Ratios of peroxide to activator can range from about 50:1 to about 1:2 by weight. In some embodiments, a useful ratio can be 10:1 by weight.

Also provided is a method of reducing the viscosity of a polymer-containing aqueous well treatment fluid in a subterranean environment, the method comprising: a) introducing a peroxide and a chelated metal activator into the polymer-containing aqueous well treatment fluid to form a well treatment composition; and b) directing the well treatment composition into the subterranean environment in an amount and for a time sufficient to reduce the viscosity of the polymer-containing aqueous well treatment fluid. The subterranean environment can be a geological formation that has been penetrated by a wellbore. The temperature of the subterranean geological formation can be from about −10° C. to about 50° C. The temperature of the subterranean geological formation can be from about 0° C. to about 30° C. The polymer-containing well treatment fluid can have a pH of about 6.0 to about 10.0. The polymer-containing well treatment fluid can include an acrylamide-derived polymer. The acrylamide-derived polymer is selected from the group consisting of polyacrylamide, acrylamide-acrylate (acrylic acid) copolymers, acrylic acid-methacrylamide copolymers, partially hydrolyzed polyacrylamide copolymers, partially hydrolyzed polymethacrylamides, and acrylamide-methylpropane sulfonate copolymers. The acrylamide-derived polymer can be a cross-linked polymer. The peroxide is hydrogen peroxide or urea peroxide. The peroxide concentration in the well treatment composition can be from about 400 ppm to about 3000 ppm. The peroxide concentration in the well treatment composition can be about 1000 ppm. The chelated metal activator is selected from the group consisting of FeEDTA, CuEDTA, FeDTPA, ferric citrate, ferrous citrate, ferrous isocitrate, ferrous aconitate, ferrous salicylate, zinc gluconate, copper citrate, ferrous lactate, and ferrous gluconate. The chelated metal activator can be FeEDTA. The concentration of the chelated metal activator can be from about 100 ppm to about 2000 ppm. The amount of the well treatment composition can be sufficient to reduce the viscosity of the aqueous well treatment fluid to less than about 1 cp.

EXAMPLES

Example 1

Materials and Methods

Hydrogen peroxide solutions were prepared by dilution of a 27% stock solution (PeroxyChem, LLC). Sodium hypochlorite (NaClO) solutions were prepared from a 14.5% stock solution (Sigma Aldrich).

Test samples: a sludge sample containing cross-linked partially hydrolyzed polyacrylamide gel was obtained from Canadian oil fields. The liquid was separated from the oily black tar layer. The initial viscosity was 23 cps. The initial pH was 8.6.

Viscosity of the gel was measured using Viscometer Grace M3500. 70 grams of gel were placed into a beaker and initial viscosity was measured before treatment at room temperature. Then oxidizer and activator were added and viscosity was monitored during 1-2 hours or until the viscosity approached that of water. Viscosity was measured at 300 rpm using a standard R1 bob. All measurements were done at room temperature.

Example 2

Figure 1A:
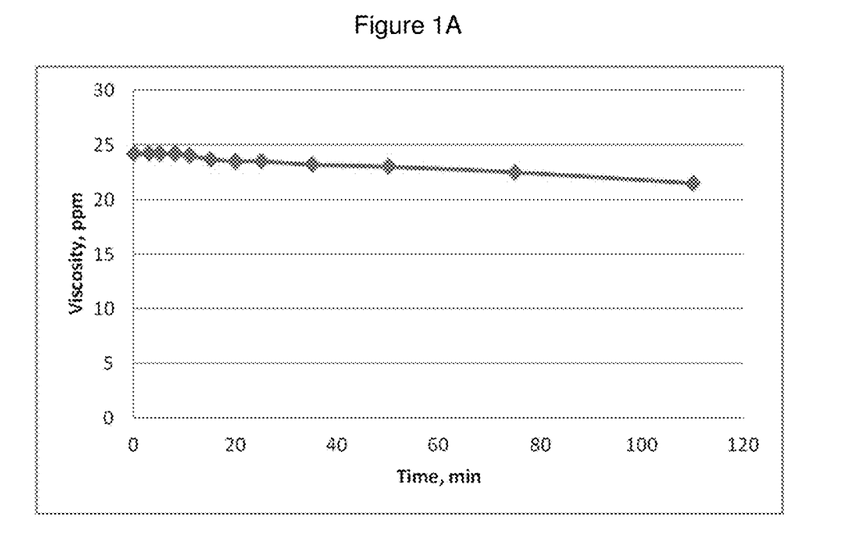
FIG. 1A is a graph depicting the results of an experiment analyzing the effect of 500 ppm of sodium hypochlorite (NaClO) on the viscosity of cross-linked partially hydrolyzed polyacrylamide gel.
Figure 1B:
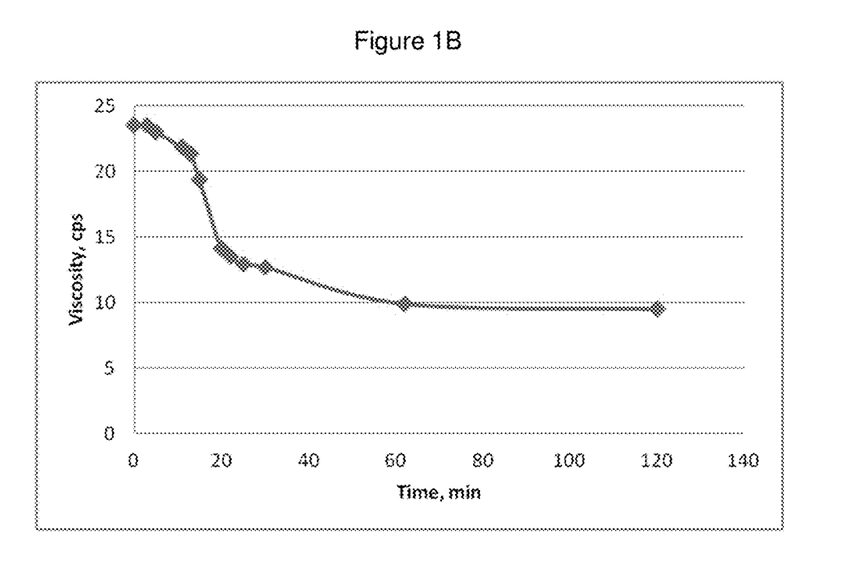
FIG. 1B is a graph depicting the results of an experiment analyzing the effect of 5000 ppm of sodium hypochlorite (NaClO) on the viscosity of cross-linked partially hydrolyzed polyacrylamide gel.

As shown in FIG. 1A, the viscosity of the gel was only slightly diminished in the presence of 500 ppm of sodium hypochlorite (NaClO) after two hours. As shown in FIG. 1B, at a higher dosage of 5,000 ppm, viscosity of the gel decreased by about 60% in two hours.

Example 3

Figure 2A:
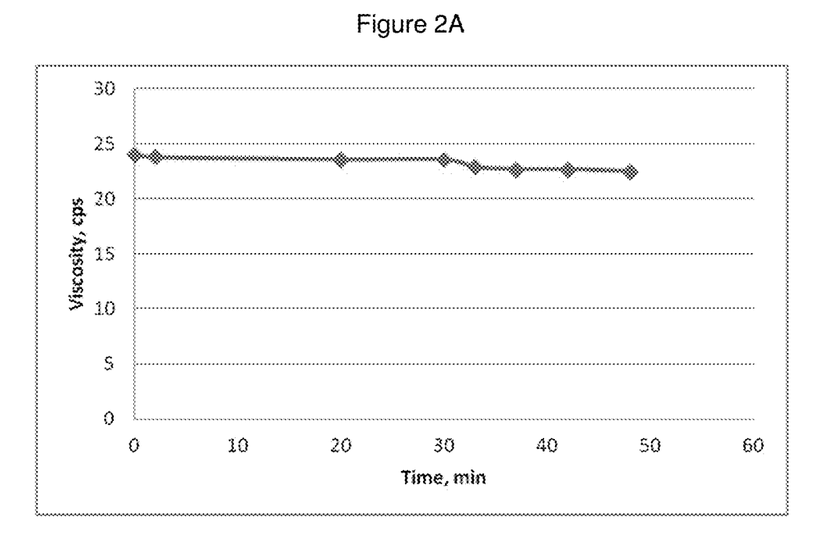
FIG. 2A is a graph depicting the results of an experiment analyzing the effect of 580 ppm of hydrogen peroxide activated by FeSO4 on the viscosity of cross-linked partially hydrolyzed polyacrylamide gel.
Figure 2B:
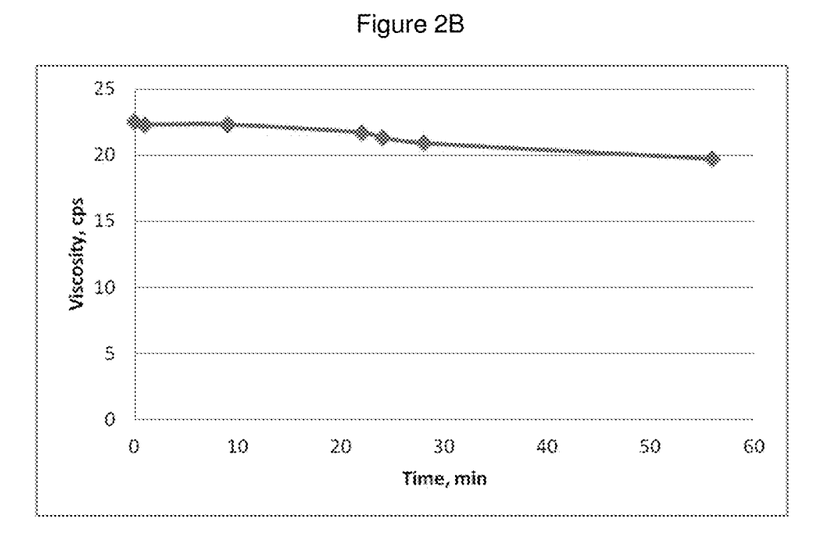
FIG. 2B is a graph depicting the results of an experiment analyzing the effect of 5015 ppm of hydrogen peroxide activated by $FeSO_4$ on the viscosity of cross-linked partially hydrolyzed polyacrylamide gel.

Treatment of the gel with a low concentration of hydrogen peroxide (580 ppm) combined with FeSO4 (75 ppm) as an activator resulted in a minimal effect on gel viscosity as shown in FIG. 2A. Increasing the concentrations of the hydrogen peroxide (5015 ppm) and the FeSO4 (475 ppm) also had no effect on gel viscosity after two hours as shown in FIG. 2B. The following day the viscosity remained relatively high, at 15.6 cP.

Figure 3:
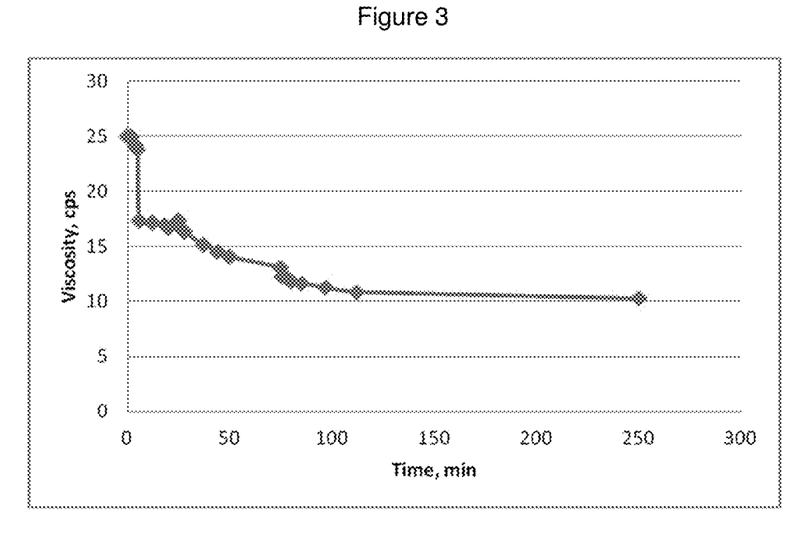
FIG. 3 is a graph depicting the results of an experiment analyzing the effect of pH reduction to 5.0 on the effect of 5015 ppm of hydrogen peroxide activated by $FeSO_4$ on the viscosity of cross-linked partially hydrolyzed polyacrylamide gel.

Adjusting the pH to 5.0 after 20 minutes of incubation by the addition of $H_2SO_4$ resulted in a substantial decrease in viscosity, as shown in FIG. 3. The data in FIG. 3 also showed that a reduced pH also resulted in increased efficiency at a lower dosage of peroxide (1000 ppm) and FeSO4 (270 ppm) However, a fine heavy precipitate was formed in the samples shown in FIG. 3. Taken together, the data in FIG. 2 and FIG. 3 indicated that FeSO4 without pH adjustment was not effective for cross-linked partially hydrolyzed polyacrylamide gel oxidation because of high pH of the samples. Reduction in the pH by the addition of acid resulted in effective oxidation, but also led to the formation of a heavy precipitate, which is undesirable in field conditions.

Example 4

Figure 4:
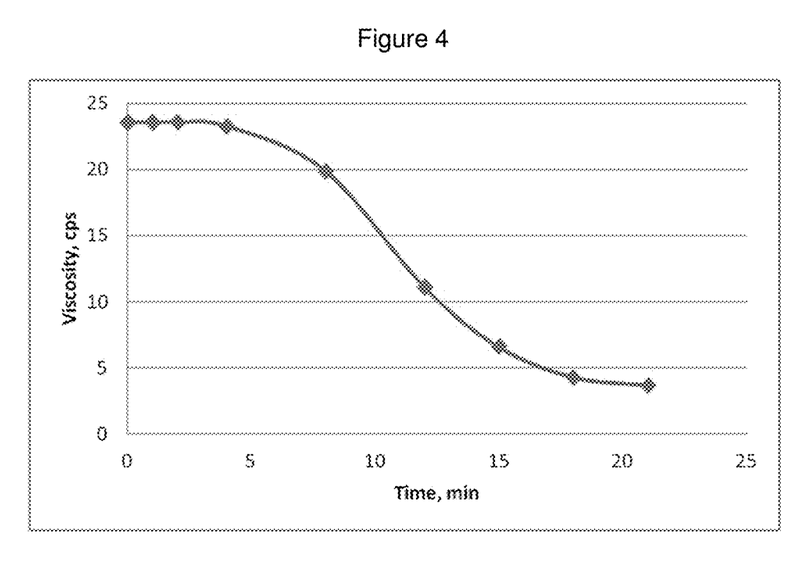
FIG. 4 is a graph depicting the results of an experiment analyzing the effect of 1000 ppm of hydrogen peroxide activated by 340 ppm FeEDTA on the viscosity of cross-linked partially hydrolyzed polyacrylamide gel.

We then tested alternative catalytic activators which would not require a pH adjustment. We found surprisingly that the combination of 1000 ppm hydrogen peroxide with FeEDTA (Akzo Nobel) as a catalyst resulted in a drop in viscosity without the formation of a precipitate. As noted in this example on the examples below, the amount of FeEDTA use was expressed as ppm of the total solid amount. FIG. 4 shows the results of an experiment using an even lower concentration of FeEDTA(340 ppm) in the presence of 1000 ppm of hydrogen peroxide. As shown in FIG. 4, viscosity was reduced to less than 5 cP in only 20 minutes without the formation of a precipitate.

Example 5

Figure 5:
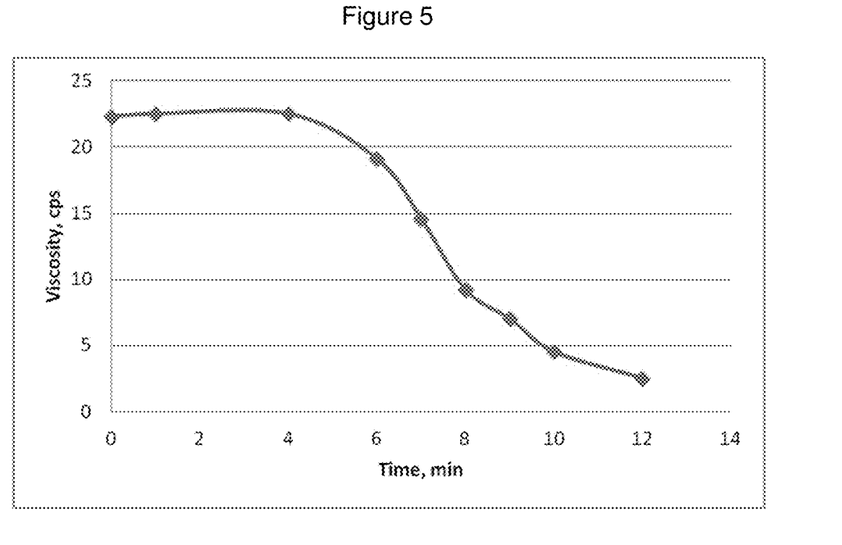
FIG. 5 is a graph depicting the results of an experiment analyzing the effect of 2000 ppm of urea peroxide activated by 1315 ppm FeEDTA on the viscosity of cross-linked partially hydrolyzed polyacrylamide gel.

We also tested hydrogen peroxide in a bonded form in order to provide a slower steady release of the oxidizer. Urea-peroxide (Sigma-Aldrich) was used at 2000 ppm, which corresponds to only 723 ppm $H_2O_2$. FeEDTA was added at 1315 ppm (as Fe). As shown in FIG. 5, we observed a rapid decrease in viscosity with the reduction to less than 5 cP within 12 minutes. The liquid following the treatment had a viscosity similar to that of water and a pH of 7.35. The liquid was homogeneous, light in color and no precipitate was formed. Residual $H_2O_2$ was 30 ppm.

Figure 6:
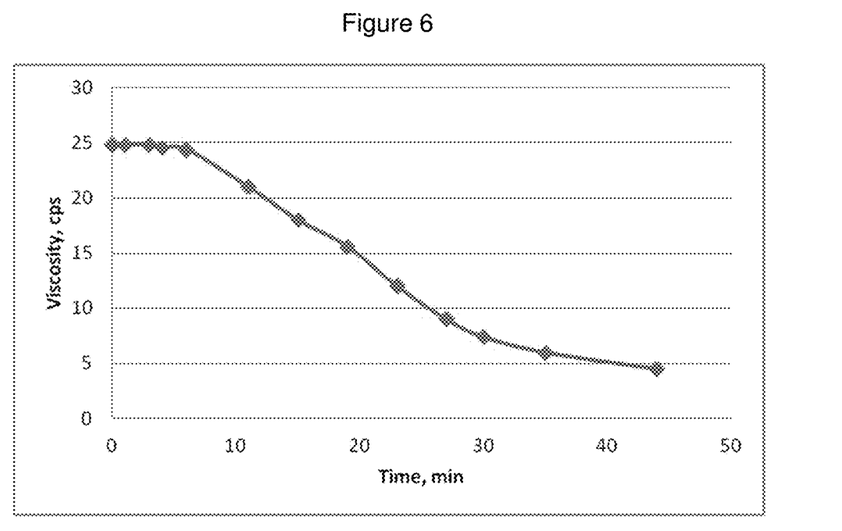
FIG. 6 is a graph depicting the results of an experiment analyzing the effect of 2000 ppm of urea peroxide activated by 130 ppm FeEDTA on the viscosity of cross-linked partially hydrolyzed polyacrylamide gel.

The results of an experiment in which the FeEDTA concentration was reduced to 130 ppm are shown in FIG. 6. The viscosity of the gel decreased to less than 5 cP in about 40 minutes. The liquid following the treatment had a viscosity similar to that of water and a pH of 7.71. The liquid was homogeneous, light in color and no precipitate was formed. Residual $H_2O_2$ was 50 ppm.

Example 6

For the studies described in Examples 7-11, the following materials and methods were used. Hydrogen peroxide solutions were prepared by dilution of a 27% stock solution (PeroxyChem, LLC). Sodium hypochlorite (NaClO) solutions were prepared from a 14.5% stock solution (Sigma Aldrich). Peracetic acid was an equilibrated aqueous containing about 15% peracetic acid, 23% hydrogen peroxide and 16% acetic acid (PeroxyChem, LLC).

Test samples were obtained from Canadian oil fields. The slick water sample contained partially hydrolyzed polyacrylamide polymer (HPAM). The liquid was separated from the oily black tar layer and used in viscosity tests described in Examples below. The sludge sample was a viscous sticky black substance composed mostly of black tar and gelled HPAM; this sludge was insoluble and not dispersible in water.

Example 7

Figure 7:
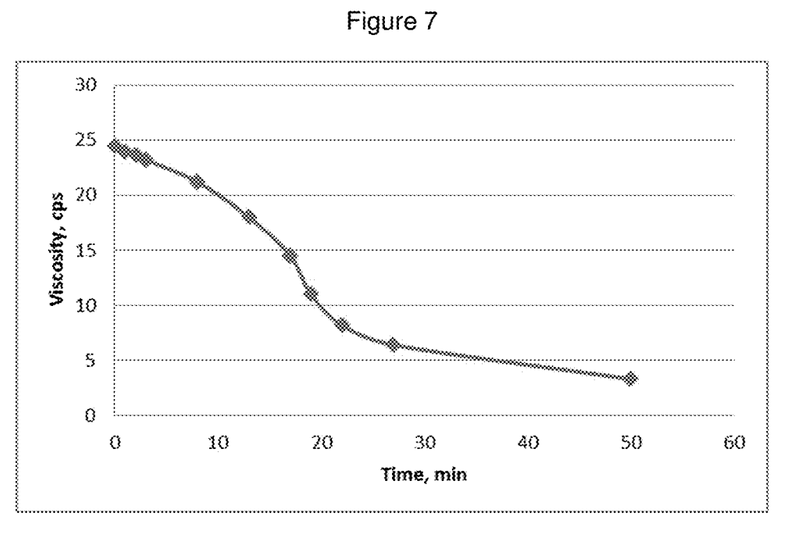
FIG. 7 is a graph depicting the results of an experiment analyzing the effect of 1000 PPM of hydrogen peroxide activated by 50 PPM FeEDTA on the viscosity of slick water.

This experiment was performed as described in Example 1, using hydrogen peroxide as the oxidizer. Treatment of the slick water sample with hydrogen peroxide at 1,000 ppm resulted only in a minimal effect on gel viscosity in 2 hours. Treatment of the slick water sample with the simultaneous addition of hydrogen peroxide at 1,000 ppm plus 50 ppm of ethylenediaminetetraacetic acid iron (III) sodium salt (FeEDTA, Akzo Nobel) at 70° F. resulted in a relatively rapid decrease in viscosity over the course of 1 hour. A. The results are shown in FIG. 7. No precipitate or gas evolution were observed during either during the first hour or 24 hours later. These data show that the combination of hydrogen peroxide plus the activator, FeEDTA, resulted in a time-dependent reduction in slick water sample viscosity.

Example 8

The slick water sample was treated as described in Example 1 using hydrogen peroxide, peracetic acid or sodium persulfate as oxidizers. Ferrous sulfate, ferrous lactate, FeEDTA and NaOH were used as activators. Treatments were carried out at either 70° F. or 40° F. Viscosity was assayed after 1 and 12 hours of treatment. The results are shown in Table 1.

TABLE 1

| Oxidizer | Oxidizer Conc., ppm | Activator | Activator Conc., ppm | Temp. (° F.) | Viscosity Reduction, % | |
|---|---|---|---|---|---|---|
| | | | | | 1 hr | 12 hr |
| None | — | None | — | 70 | 0 | 0 |
| $H_2O_2$ | 1,000 | None | — | 70 | 3 | 8 |
| $H_2O_2$ | 5,000 | FeSO4 | 500 | 70 | 13 | 31 |
| $H_2O_2$ | 1,000 | Fe EDTA | 250 | 70 | 92 | 93 |
| $H_2O_2$ | 500 | Fe EDTA | 50 | 70 | 74 | 93 |
| PAA | 2,500 | None | — | 70 | 16 | 48 |
| PAA | 5,000 | None | — | 70 | 24 | 84 |
| PAA | 2,000 | Fe EDTA | 500 | 70 | 24 | 88 |

TABLE 1-continued

| Oxidizer | Oxidizer Conc., ppm | Activator | Activator Conc., ppm | Temp. (° F.) | Viscosity Reduction, % 1 hr | Viscosity Reduction, % 12 hr |
|---|---|---|---|---|---|---|
| Sodium persulfate | 10,000 | Fe Lactate | 500 | 70 | 33 | 63 |
| Sodium persulfate | 5,000 | NaOH | 100 | 70 | 0 | 0 |
| Sodium persulfate | 5,000 | Fe EDTA | 500 | 70 | 25 | 32 |
| $H_2O_2$ | 2,500 | Fe EDTA | 250 | 40 | 52 | 91 |
| $H_2O_2$ | 5,000 | Fe EDTA | 500 | 40 | 70 | 92 |

As shown in Table 1, the combination of hydrogen peroxide and Fe EDTA resulted in a substantial reduction in the slick water sample viscosity after a 1 hour treatment even at a temperature of 40° C. A reduction more than 90% was observed after 12 hours at both 70° C. and 40°. The combination of hydrogen peroxide and ferrous sulfate resulted in the formation of a brown precipitate, which is undesirable in field conditions. Peracetic acid treatment in the absence of activator produced a decrease in slick water sample viscosity, but at relatively higher concentrations compared to hydrogen peroxide. Peracetic acid in the absence of activator also produced a decrease in pH of the treated solution. Sodium persulfate also produced a drop in slick water sample viscosity but at higher concentrations compared to hydrogen peroxide and at higher concentrations of activator. Of the activators tested, sodium hydroxide had no effect on slick water sample viscosity.

Example 10

We analyzed the effect of surfactant on solubilization of the HPAM sludge component. Test solutions included hydrogen peroxide or urea/hydrogen peroxide as the oxidizer and 250 ppm FeEDTA as the activator. VeruSOL® (VeruTEK Technologies), a biodegradable, plant-based surfactant was used as the surfactant. For analysis, about 2.0 g of sludge was placed into a pre-weighed test tube. Test solutions were prepared in tap water and 50 mL of the solution was added to each tube. Oxidizers and surfactants were added in the amounts shown in Table 2. In some tests, an alcohol ("co-solvent") was added to simulate the slickwater operations at low temperatures, in which an alcohol is added to prevent freezing of the liquid. Then the test tubes were shaken using a lab shaker for 2 hours at 40° F. or 70° F. The liquid was then removed from the tubes. The tubes were dried in an oven for one hour at 100° F. The dried tubes were reweighed and the weight of remaining tar/sludge was calculated as percent of the control test where sludge was dried in oven without any treatment. The results are shown in the Table 2.

TABLE 2

| Oxidizer | Oxidizer Conc., ppm | Temp. (° F.) | Surfactant, % | Co-solvent, % | Sludge removed, % |
|---|---|---|---|---|---|
| None | — | 70 | — | — | 6 |
| $H_2O_2$ | 2,500 | 70 | — | — | 34 |
| $H_2O_2$ | 2,500 | 70 | 0.50 | — | 69 |
| $H_2O_2$ | 2,500 | 70 | 0.75 | — | 84 |
| $H_2O_2$ | 2,500 | 70 | 0.75 | Methanol, 5.0 | 90 |
| $H_2O_2$ | 2,500 | 70 | 0.75 | Isopropanol, 7.0 | 92 |
| Urea/$H_2O_2$ | 5,000 | 70 | 0.75 | — | 88 |
| $H_2O_2$ | 2,500 | 40 | — | — | 19 |
| $H_2O_2$ | 3,500 | 40 | 0.50 | — | 58 |
| Urea/$H_2O_2$ | 5,000 | 40 | 0.75 | Methanol, 5.0 | 76 |

As shown in Table 2, the addition of surfactant increased the percentage of sludge removed from the tubes. This increase was noted both in samples containing hydrogen peroxide and in samples containing bonded hydrogen peroxide (urea/hydrogen peroxide). Addition of co-solvent also increased the percentage of sludge removed from the tubes.

Example 11

We analyzed the stability of the hydrogen peroxide/Fe EDTA oxidizer-activator system. Solutions of $H_2O_2$ were prepared without stabilizer, or with the addition of either urea or citric acid. Then the activator (Fe EDTA) was added to the oxidizer solutions. The combined solutions were incubated at room temperature, 70° F. Periodically a sample of liquid was taken and the % of the remaining $H_2O_2$ was measured by titration with 0.1N KMnO4. The results are shown in the Table 3.

TABLE 3

| $H_2O_2$, % | FeEDTA, ppm | Stabilizer | Stabilizer Conc., ppm | Surfactant, % | Co-solvent, % | $H_2O_2$, % remaining 24 hrs | $H_2O_2$, % remaining 90 hrs |
|---|---|---|---|---|---|---|---|
| 1.25 | 500 | — | — | — | — | 41 | 2 |
| 1.25 | 500 | Urea | 2.20 | — | — | 83 | 74 |
| 1.25 | 500 | Citric Acid | 0.125 | — | — | 70 | 50 |
| 5.00 | 1,000 | Urea | 8.90 | 0.50 | Isopropanol, 7.0 | 61 | 37 |
| 1.25 | 500 | Citric Acid | 0.125 | 0.75 | Isopropanol, 7.0 | 88 | 74 |
| 1.25 | 500 | Urea | 2.20 | 0.37 | Methanol, 5.0 | 92 | 81 |

As shown in Table 3, the percentage of hydrogen peroxide remaining after 24 hours was relatively higher in those samples that were stabilized with either urea or citric acid. By 90 hours, the hydrogen peroxide was nearly completely decomposed in those samples that did not include a stabilizer. The addition of citric acid or urea resulted in retention of 50% and nearly 75%, respectively, of hydrogen peroxide after 90 hours. The addition of surfactant and co-solvent also increased the stability of hydrogen peroxide after 90 hours.

What is claimed is:

1. A method of restoring the permeability of a wellbore or underground formation wherein the permeability of the wellbore or underground formation has become impeded by sludge comprising a tar deposit or a combination of a tar deposit and a gelled synthetic polymer, the method comprising:
   a) introducing an aqueous composition comprising an oxidizer, wherein the oxidizer is hydrogen peroxide or carbamide peroxide, a chelated metal activator, a surfactant selected from the group consisting of ethoxylated castor oil, ethoxylated fatty acids, alcohol sulfates, alcohol ethoxylates, amine N-oxides or a combination thereof, and a stabilizer wherein the stabilizer is urea or citric acid, into the wellbore or underground formation; and
   b) contacting the sludge comprising the tar deposit or the combination of a tar deposit and a gelled synthetic polymer, with the aqueous composition for up to about 24 hours to dissolve or substantially dissolve the sludge without the formation of a precipitate, thereby restoring the permeability of the well bore or underground formation.

2. The method of claim 1, wherein the subterranean environment comprises a geological formation.

3. The method of claim 1, wherein the oxidizer is hydrogen peroxide.

4. The method of claim 1, wherein the oxidizer is carbamide peroxide.

5. The method of claim 1, wherein the oxidizer concentration in the well treatment composition is from about 500 ppm to about 25,000 ppm.

6. The method of claim 1, wherein the chelated metal activator is selected from the group consisting of FeEDTA, FeDTPA, ferric citrate, ferrous citrate, ferrous isocitrate, ferrous aconitate, ferrous salicylate, zinc gluconate, ferrous lactate, and ferrous gluconate.

7. The method of claim 1, wherein the aqueous composition further comprises a biocide.

8. The method of claim 1, wherein the surfactant comprises a mixture of two or more of ethoxylated castor oil, ethoxylated fatty acids, D-limonene, alcohol sulfates, alcohol ethoxylates, or amine N-oxides.

9. The method of claim 1, wherein the stabilizer is urea.

10. The method of claim 1, wherein the stabilizer is citric acid.

11. The method of claim 1, wherein the aqueous composition further comprises a co-solvent selected from the group consisting of methanol, isopropanol, and a mixture of methanol and isopropanol.

12. The method of claim 1, wherein the sludge is deposited on the surface of the wellbore, filters, or drilling equipment.

13. The method of claim 1, wherein the surfactant concentration in the well treatment composition is from about 0.5% to about 5%.

14. The method of claim 1, wherein the surfactant concentration in the well treatment composition is from about 0.5% to about 1%.

15. the method of claim 1, wherein the pH of the aqueous composition is neutral or alkaline.

* * * * *